United States Patent [19]

Hackett

[11] Patent Number: 4,573,248
[45] Date of Patent: Mar. 4, 1986

[54] METHOD AND MEANS FOR IN SITU REPAIR OF HEAT EXCHANGER TUBES IN NUCLEAR INSTALLATIONS OR THE LIKE

[76] Inventor: Steven B. Hackett, 17822 Arbor La., Irvine, Calif. 92715

[21] Appl. No.: 270,574

[22] Filed: Jun. 4, 1981

[51] Int. Cl.[4] ............ B23P 17/00; B23P 11/02; B23P 15/26
[52] U.S. Cl. ............ 29/423; 29/402.09; 29/447; 29/157.3 C; 29/DIG. 35; 138/98
[58] Field of Search ............ 29/727, 157.3 C, 447, 29/157.4, 402.09, 423, DIG. 35; 138/97, 98, 99

[56] References Cited

U.S. PATENT DOCUMENTS

| 1,955,728 | 4/1934 | Allen et al. | 29/447 |
| 1,980,156 | 11/1934 | Emrick | 29/447 |
| 2,245,608 | 6/1941 | Rogers | 29/447 |
| 2,539,057 | 1/1951 | Brown | 29/447 |
| 2,986,847 | 6/1961 | Sato | 29/447 X |
| 3,064,344 | 11/1962 | Arne | 29/447 X |
| 3,068,562 | 12/1962 | Long | 29/447 |
| 3,889,351 | 6/1975 | Tischlinger | 29/447 |
| 3,900,939 | 8/1975 | Greacen | 29/402.09 |
| 4,332,073 | 6/1982 | Yoshida et al. | 29/447 |

FOREIGN PATENT DOCUMENTS 47703  3/1977  Japan .................. 29/402.09

Primary Examiner—Howard N. Goldberg
Assistant Examiner—Vernon K. Rising
Attorney, Agent, or Firm—Weissenberger & Peterson

[57] ABSTRACT

A method for the in situ repair of heat exchanger tubes in major heat exchanger equipment is disclosed in which supercooled sleeves are inserted into cracked heat exchanger tubes and are expansion-fitted firmly against the inner walls of the cracked tubes. In order to prevent premature expansion of the relatively long, small diameter sleeves during insertion, the tubes may be filled with a heat sink material which is removed following insertion. The insertion is also preferably accomplished very rapidly by means of a power-actuated ram which maintains the sleeve at its low temperature until the very last moment before insertion. Various guide means and plug means for the sleeve are described. The technology is also indicated as being applicable to the temporary sealing of defective tubes by using a removable plug in the form of a closed-end sleeve into whose interior a cryogenic agent can be selectively introduced during insertion and removal.

5 Claims, 8 Drawing Figures

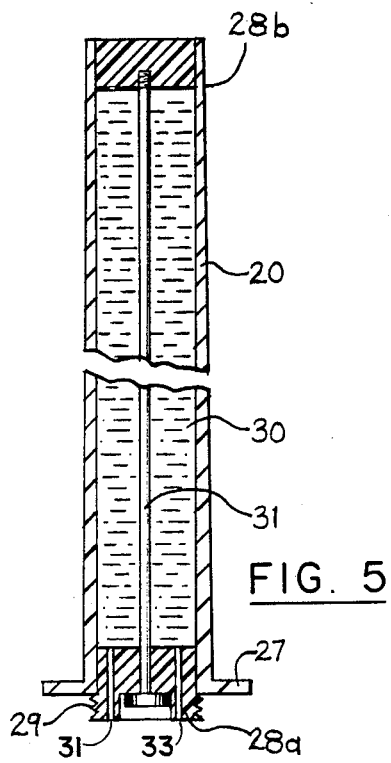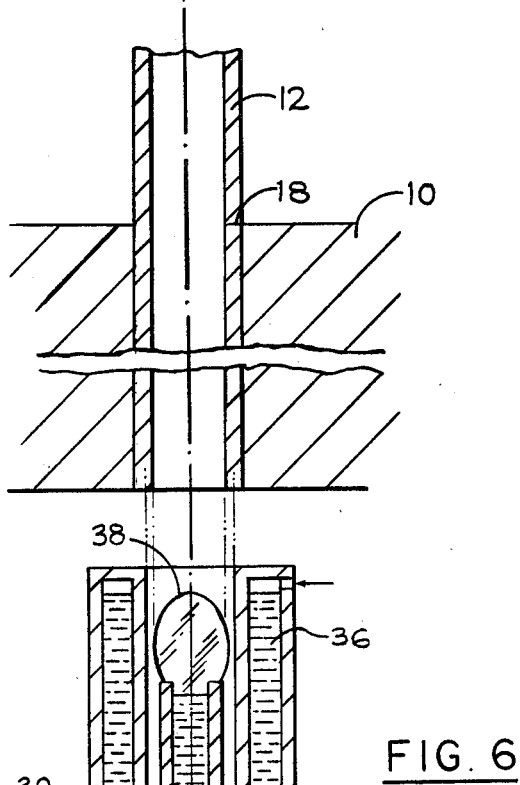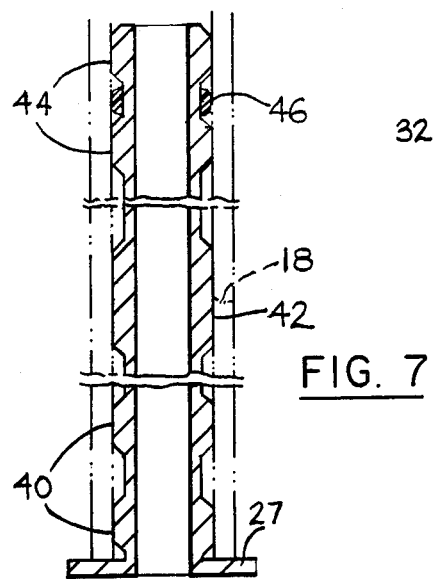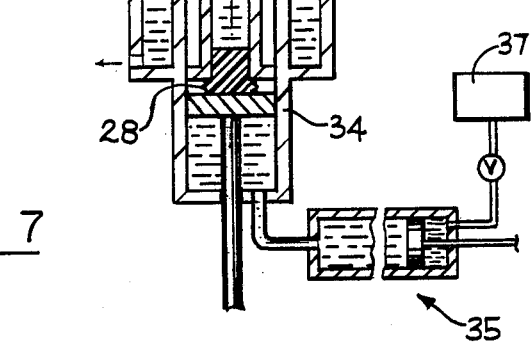

METHOD AND MEANS FOR IN SITU REPAIR OF HEAT EXCHANGER TUBES IN NUCLEAR INSTALLATIONS OR THE LIKE

This invention relates to the repair of major heat exchanger equipment, and is particularly useful for the in situ repair of heat exchanger tubes which are located in equipment where access is difficult due to radioactivity or other problems.

For example, in a typical commercial nuclear installation of the type commonly used in power generation, heat generated in the reactor core by the nuclear fuel is used to heat primary water whose energy is transferred to a secondary steam system through a heat exchanger. The secondary steam system drives the power-generating turbines. The highly radioactive water is contained inside the heat exchanger within a large number of Inconel tubes which extend into the heat exchanger from a stainless steel tubesheet. Typically, the tube sheet may be a stainless steel plate of a thickness on the order of 50 cm, and the heat exchanger tubes may be on the order of 2 cm or less in diameter. Typically, there are many thousands of these tubes in a single heat exchanger.

A recurrent problem in this type of installation is the fact that a hard sludge builds up in the heat exchanger around the base of the tubes where they emerge from the tube sheet. The corroding effects of the sludge, combined with the thermal stresses resulting from the different expansion coefficients of the material present at the tube sheet/sludge interface, eventually result in hairline cracks in the tube walls at the interface. These cracks allow small amounts of the radioactive primary water to leak into the secondary steam system, thereby causing the secondary system to become radioactively contaminated.

In the prior art, attempts have been made to insert Inconel sleeves into cracked tubes and to weld the top and bottom of the sleeve to the inside of the heat exchanger tube. However, these welds are expensive and have often been unsatisfactory due to the heat sink effect of the sludge, as well as to the difficulty of handling welding equipment in small spaces with robot equipment.

Another prior art method has involved the insertion of a sleeve followed by a mechanical rolling of the sleeve from the inside to expand it into contact with the inner wall of the heat exchanger tube. This method was also unsatisfactory because it was impossible to get a uniform bond with sufficient hoop stress between the sleeve and tube, particularly where the tube was deformed.

In practice, most of the cracked tubes have simply been sealed by plugging them at the tubesheet surface. This, of course, reduces the efficiency of the steam supply system and eventually destroys its usefulness.

SUMMARY OF THE INVENTION

The present invention provides an effective and relatively inexpensive method of satisfactorily repairing cracked heat exchanger tubes in situ by inserting into the cracked tube a supercooled sleeve whose outside diameter is smaller than the inside diameter of the heat exchanger tube at insertion. Once inserted, the sleeve can expand in a controlled manner, as it warms up, to form a strong and uniform bond with the interior surface of the tube throughout a substantial length thereof.

By proper selection of the sleeve dimensions, the bond between the expanded sleeve and the heat exchanger tube can be controlled so that the sleeve will not overstress the tube yet will easily achieve the desired mechanical strength and sealing parameters necessary to form an effective seal against any water penetration without the need for welding.

In accordance with the invention, the sleeve is preferably cooled to a very low temperature (as low as $-195°$ C., if desired, for Inconel) in an appropriate cryogenic bath. The sleeve is preferably filled with a heat sink or cryogenic material such as ethylene glycol or a liquid gas, depending on the temperature involved, to retard its expansion. The sleeve is then inserted into the heat exchanger tube by means of a hydraulic ram or similar apparatus. Finally, the heat sink material is removed from the interior of the sleeve so as to open the sleeve for the passage of water therethrough.

In accordance with a related aspect of the invention, heat exchanger tubes may be temporarily plugged pending more extensive repairs by inserting a plug or closed-ended sleeve filled with a cryogenic fluid into the end of the tube, and draining the cryogenic fluid to seat the plug. When desired, the plug may easily be removed by re-introducing the cryogenic fluid and pulling the plug out.

BRIEF DESCRIPTION OF THE DRAWINGS

FIG. 5 is a longitudinal section of a sleeve made in accordance with the preferred embodiment of the invention;

FIG. 6 is a partially schematic view illustrating a preferred method of insertion of the sleeve in accordance with this invention;

FIG. 7 is a longitudinal section of an alternative form of sleeve; and

DESCRIPTION OF THE PREFERRED EMBODIMENT

Figure 1:
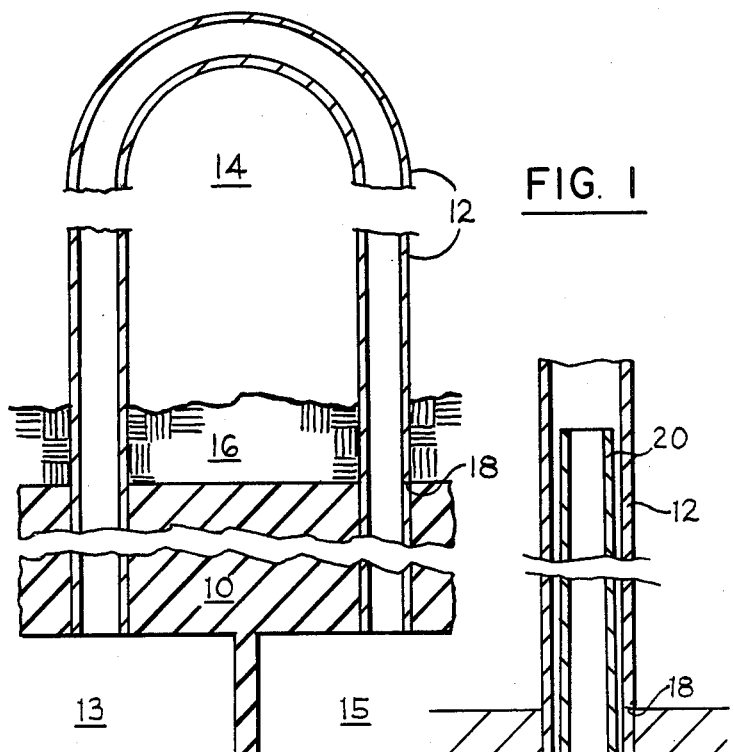
FIG. 1 is a vertical section of a portion of a heat exchanger pertinent to this invention.

FIG. 1 shows a portion of the primary/secondary system heat exchanger in a typical nuclear power installation, and of one of the heat exchanger tubes associated therewith. In FIG. 1, the heat exchanger enclosure includes a stainless steel tube sheet, typically about 50 cm thick, through which a large number of heat exchanger tubes 12 enter the heat exchanger vessel 14 to transfer the heat of the primary water system to the secondary steam system which drives the power-generating turbines. Primary water is introduced into tubes 12 from the inlet plenum 13 and is discharged from the tubes 12 into outlet plenum 15.

In the normal course of operation of the heat exchanger, a layer of sludge 16 forms on the bottom of the heat exchanger vessel 14 adjacent the tube sheet 10. Due to the corrosive action of some components of the sludge 16 and to the differing expansion coefficients of the sludge and the stainless steel tube sheet 10, stresses are applied to the tubes 12 at the interface between the sludge 16 and the radiation shield 10. Over a period of time, these stresses frequently result in hairline cracks 18 forming in the walls of the tubes 12 at the interface, and the resulting contamination of the secondary steam by seepage of the highly radioactive primary water requires that any cracked heat exchanger tube be either repaired or sealed off. The latter alternative reduces the efficiency of the steam supply system and eventually causes it to become useless; the former alternative presents very serious problems due to the high temperatures involved and due to the fact that any repairs must be made from the inside of the heat exchanger tubes, as the outside of the tubes is inaccessible for practical purposes due to the concrete-like consistency of the sludge 16. In addition, the radioactive environment requires that all repairs be made by limited personnel access and with remote-controlled machine tools.

A handling problem arises in making any repairs inside the tube 12 by virtue of the fact that the only satisfactory method of repair involves the insertion of an Inconel sleeve 20 (FIGS. 2 through 7) into the cracked tube. Typically heat exchanger tubes 12 may have an interior diameter of about 1.7 cm, and for proper sealing of the tubes 12 throughout the thickness of the sludge layer, it is necessary that the sleeves be on the order of one meter long. It will be readily appreciated that sleeves of these dimensions cannot be readily press-fitted into the tubes with enough force to provide an adequate seal. Even in situ rolling of the sleeve 20 after insertion does not provide hoop stresses sufficient for an adequate seal without causing plastic deformation of the heat exchanger tubes 12.

To overcome this problem, the present invention proposes to cool the sleeve 20 to a very low temperature, preferably on the order of $-125°$ C. to $-195°$ C. for Inconel sleeves. The precise temperature for any given application would be determined by how far the sleeve can be cooled without its material becoming brittle so as to risk damage during insertion, or altering the basic molecular structure of the material.

Figures 2, 3:
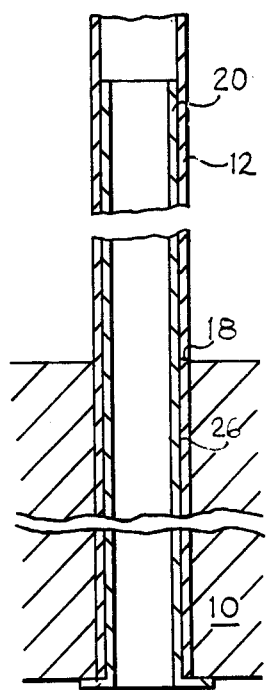
FIG. 2 is a detail section similar to FIG. 1 showing one embodiment of the present invention immediately after insertion of the supercooled sleeve.
FIG. 3 is a view similar to FIG. 2 but showing the same embodiment after the sleeve has warmed up.
Figure 4:
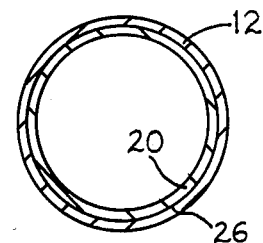
FIG. 4 is a horizontal section of FIG. 3.

The sleeve 20 is so dimensioned that at room temperature, its outside diameter is very slightly (generally on the order of about 2-3 $\mu$m) larger than the inside diameter of the heat exchanger tube 12 at the same temperature. When cooled, however, the sleeve 20 shrinks sufficiently to where its outer diameter is significantly (e.g. on the order of 7-12 $\mu$m) smaller than the inner diameter of the heat exchanger tube 12. It is therefore possible to insert the supercooled sleeve 20 with relative ease into the heat exchanger tube 12 as far as the flange 27 will allow, as shown in FIG. 2. Once in place, the sleeve 20 warms up and expands in a controlled manner into intimate sealing contact with the interior wall of heat exchanger tube 12 as shown in FIGS. 3 and 4. With proper dimensioning of the sleeve 20, the sleeve will produce a hoop stress low enough to avoid deformation of the tube 12, yet high enough to make the interface 26 (FIG. 4) impenetrable to water even under considerable pressure. As is inherent in any expansion fit, the sleeve 20 will expand in such a way as to adapt its shape to the interior shape of tube 12 and to equalize the hoop stress around its circumference. Once the sleeve 20 has expanded, it forms for all practical purposes an integral part of the heat exchanger tube 12 and thereafter expands and contracts with it without disturbing the seal.

A practical problem arises from the fact that it is rather difficult to maintain the sleeve 20 at a sufficiently low temperature until it is fully inserted into the heat exchanger tube 12. In one of its aspects, the invention solves this problem by plugging the ends of the sleeve 20 with a soft material 28 such as Teflon and filling the tube 20 with a heat sink material 30 having a high thermal coefficient. Ethylene glycol is suitable for this purpose, although other materials (fluid or solid, in which latter case the plugs 28 are unnecessary) with suitable characteristics may also be used. An example of such other material is liquid nitrogen, which may be introduced into the body of sleeve 20 through closeable valve ducts 31, 33. The material 30 acts as a heat sink and retards the expansion of sleeve 20 sufficiently to allow its insertion into the tube 12.

The use of a liquid or solid heat sink material 30 also provides a certain amount of rigidity to the sleeve 20 during insertion, in that the incompressible liquid or solid tends to counteract any tendency of the sleeve 20 to collapse.

The lower plug 28a may be provided with threads 29 allowing it to be gripped by a withdrawal tool (not shown), and a connecting member 31 (such as a bar or a chain) may be used to pull the upper plug 28b out of the sleeve 20 when the lower plug 28a is removed.

Insertion of the sleeve 20 and removal of the plugs 28 can further be facilitated by tapering the sleeve 20 toward the inner end to a slight degree as suggested in FIG. 5. The taper must be sufficiently small so that a proper bond will still be formed with the tube 12 at the upper end of sleeve 20 when sleeve 20 expands, without unduly compressing the lower end of tube 12 upon expansion of the sleeve 20.

In spite of the foregoing considerations, it is still desirable to insert the sleeve 20 rather rapidly. For this reason, the invention contemplates in its preferred embodiment (FIG. 6) that the sleeve 20 be inserted by means of a ram device 32 which may shoot the sleeve 20 into the tube 12 by means of a hydraulic piston 34 operated in a conventional manner by a hydraulic system 35 powered by a compressed air system 37. The required velocity depends on various parameters, including frictional heat generated by the insertion. The latter may be reduced by coating the sleeve 20 with a thin coat of lubricant such as Teflon. A refrigerant jacket 36 may be provided on the ram 32 so as to maintain the sleeve 20 at a low temperature until the moment of insertion.

It will be understood that other means of insertion may be used without departing from the spirit of the invention as long as the insertion is sufficiently rapid so that warming of the sleeve and its consequent expansion does not cause it to jam within the tube 12 during insertion.

Normally, the tolerances involved in the method of the invention are quite small, so that accurate centering of the sleeve 20 with respect to tube 12 during insertion is necessary. The proper alignment of the ram 32 with the tube 12 is readily accomplished in a conventional manner by commercially available alignment tools. The centering of the sleeve 20 can be further aided, however, as shown in FIG. 6, by forming a bullet-like plug 38 of dry ice whose widest parts can serve as a guide for the sleeve 20. After insertion and removal of the heat sink material 30, the dry ice quickly sublimates and disappears, leaving the upper end of sleeve 20 open.

FIG. 7 shows an alternate way of reducing friction during insertion by grooving the outer surface of sleeve 20. Particularly in its lower portion, where tube 12 is confined by the tubesheet 10, there is no likelihood of cracks, and a few spaced annular seals 40 are sufficient.

At the interface, where cracks are the most likely, a long seal 42 may be used. At the upper end of sleeve 20, a few annular seals 44 are again sufficient, aided if desired by a compressible Teflon seal or rust joint 46. Other forms of the sleeve 20 may also be used as particular applications may indicate. In particular, the long seal 42 may be omitted and reliance placed on the end seals 40, 44 alone.

Figure 8:
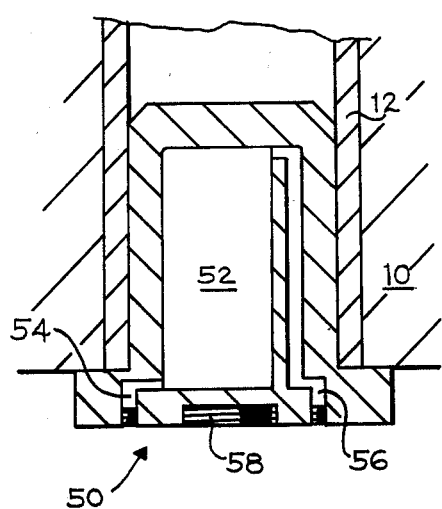
FIG. 8 is a vertical section of a removable plug constructed in accordance with the invention.

Referring now to FIG. 8, it is sometimes desirable to temporarily plug a tube 12 for any one of various reasons. In accordance with the invention, this is readily accomplished by using a short closed expansion-fit sleeve as a plug 50. The plug 50 is provided with a chamber 52 into which a cryogenic agent such as liquid nitrogen may be introduced through conduits 54, 56. Following insertion at low temperature, the plug is allowed to expand into an expansion fit with tube 12 by removing the cryogenic agent. When it is desired to remove the plug, the cryogenic agent is reintroduced, causing the plug 50 to shrink, and the plug 50 can then be pulled out by an appropriate pulling tool threaded into threads 58.

I claim:

1. A method of sealing leaky heat exchanger tubes in situ in nuclear installations, comprising the steps of:
    (a) providing a sleeve having an outer diameter slightly larger than the inner diameter of the tube whose leak is to be sealed and having a length shorter than the length of said tube yet sufficient to overlap said leak and having a flange at one end thereof, said flange being dimensioned larger than the inner diameter of said tube for limiting insertion of said sleeve into the tube;
    (b) cooling said sleeve to a temperature at which its outer diameter is sufficiently reduced to allow insertion of said sleeve into said tube;
    (c) inserting said cooled sleeve into said tube to be sealed through one end of the tube to overlap said leaky portion while said sleeve is so cooled until said insertion is limited by said flange;
    (d) allowing said sleeve to warm up to the temperature of said tube,
    (e) said sleeve being open at both ends such that fluids flowing through said heat exchanger tube flow through said sleeve also; and
    (f) guiding said sleeve into position for insertion by means of a guide fabricated of material which is solid at insertion temperatures but becomes fluid at room temperature, and allowing said guide to become fluid when the insertion of said sleeve is complete,
    whereby said sleeve forms with the inside of said tube in the region of said leak a leak-proof sealing bond with a generally uniform hoop stress thereby repairing said leak.

2. A method plugging heat exchanger tubes in situ in nuclear installations, comprising the steps of:
    (a) providing a sleeve having an outer diameter slightly larger than the inner diameter of the tube to be plugged and having a length shorter than the length of the tube, said sleeve having is ends closed forming a chamber;
    (b) cooling said sleeve to a temperature at which its outer diameter is sufficiently reduced to allow insertion of said sleeve into said tube by temporarily introducing a cryogenic agent into said chamber;
    (c) inserting said cooled sleeve into said tube to be sealed through one end of the tube while said sleeve is so cooled;
    (d) removing said cryogenic agent from said chamber;
    (e) allowing said sleeve to warm up to the temperature of said tube, and
    (f) guiding said sleeve into position for insertion by means of a guide fabricated of material which is solid at insertion temperatures but becomes fluid at room temperature, and allowing said guide to become fluid when the insertion of said sleeve is complete,
    whereby said sleeve forms a plug preventing any fluid from entering the heat exchanger tube.

3. A method of sealing leaky heat exchanger tubes in situ in nuclear installations, comprising the steps of:
    (a) providing a sleeve having an outer diameter slightly larger than the inner diameter of the tube whose leak is to be sealed and having a length shorter than the length of said tube yet sufficient to overlap said leak;
    (b) cooling said sleeve to a temperature at which its outer diameter is sufficiently reduced to allow insertion of said sleeve into said tube;
    (c) providing at one end of said sleeve a guide for insertion formed of a material which is solid when said sleeve is cooled but becomes fluid at higher temperatures;
    (d) inserting said cooled sleeve into said tube to be sealed through one end of the tube using said guide for proper positioning thereof while said sleeve is so cooled; and
    (e) allowing said sleeve to warm up to the temperature of said tube,
    whereby said guide becomes fluid and said sleeve forms with the inside of said tube in the region of said leak a leak-proof sealing bond with a generally uniform hoop stress thereby repairing said leak.

4. The method of claim 3, in which said sleeve is slightly tapered.

5. The method of claim 3, in which said insertion step is accomplished by rapidly propelling said sleeve into said tube.

* * * * *